(12) United States Patent
Wilda

(10) Patent No.: US 6,820,500 B2
(45) Date of Patent: Nov. 23, 2004

(54) SMALL PIPE BORE ULTRASONIC FLOWMETER DETECTOR

(75) Inventor: Douglas W. Wilda, Ambler, PA (US)

(73) Assignee: Honeywell International Inc., Morristown, NJ (US)

( * ) Notice: Subject to any disclaimer, the term of this patent is extended or adjusted under 35 U.S.C. 154(b) by 9 days.

(21) Appl. No.: 10/192,965

(22) Filed: Jul. 10, 2002

(65) Prior Publication Data

US 2004/0007079 A1 Jan. 15, 2004

(51) Int. Cl.[7] ................................................. G01F 1/66
(52) U.S. Cl. ................................................. 73/861.29
(58) Field of Search ........................ 73/861.29, 861.27, 73/861.28, 861.31

(56) References Cited

U.S. PATENT DOCUMENTS

| | | | | |
|---|---|---|---|---|
| 4,011,753 A | * | 3/1977 | Hausler | 73/861.28 |
| 4,365,518 A | * | 12/1982 | Zacharias, Jr. | 73/861.31 |
| 5,458,004 A | * | 10/1995 | van der Pol | 73/861.29 |
| 5,717,145 A | | 2/1998 | Yasuhara et al. | |
| 5,728,948 A | * | 3/1998 | Bignell et al. | 73/861.28 |
| 6,422,093 B2 | * | 7/2002 | Feller | 73/861.27 |
| 6,520,027 B1 | * | 2/2003 | Ochiai | 73/861.27 |

OTHER PUBLICATIONS

Thermo Polysonics; Technical Bulletin #7: Clamp–On Ultrasonic Flowmeters for Liquid Measurement; Dec. 2001; six pages; Houston, Texas.

* cited by examiner

Primary Examiner—Edward Lefkowitz
Assistant Examiner—Jewel V. Thompson
(74) Attorney, Agent, or Firm—Anthony Miologos

(57) ABSTRACT

A flowmeter detector for determining the flow volume of a fluid medium that includes a measuring line having first and second ends and a fluid medium entry and exit ports adjacent the fist and second ends and fluid medium flowing between the entry and exit ports is disclosed. An acoustic transducer is located at each end of the measuring line and each acoustic transducer has an overall dimension less than the cross-section diameter of the measuring line. The acoustic transducers are first operated to simultaneously transmit pulsed acoustic energy into the measuring line. The transducers are subsequently operated to receive the acoustic energy propagated through the measuring line. The flow volume is determined by evaluating the difference in the travel times of the pulsed acoustic energy propagated through the measuring line.

8 Claims, 3 Drawing Sheets

SMALL PIPE BORE ULTRASONIC FLOWMETER DETECTOR

BACKGROUND OF THE INVENTION

1. Field of the Invention

The present invention relates generally to a detector for apparatus that determines the velocity of fluid flow in a pipe or tube using ultrasonic waves and, more particularly, to a flowmeter detector for use with pipes having small bore diameters and/or low flow rates.

2. Discussion of the Related Art

Ultrasonic flowmeters use acoustic waves or vibrations of a frequency>20 kHz to detect the velocity of a fluid flowing within a pipe or tube. Depending on the design, they use either wetted or nonwetted transducers mounted on the pipe perimeter to couple ultrasonic energy with the fluid flowing in the pipe.

The velocity of the fluid flowing within the pipe is determined on the basis of a difference between the propagation velocity of the ultrasound propagating downstream and that of the ultrasound propagating upstream. These so-called transit-time meters, as the name implies, measure the difference in travel time between pulses simultaneously transmitted in the direction of, and against, the fluid flow. This type of meter, also called time of flight and time of travel, uses a pair of transducers, each capable of both transmitting and receiving the ultrasound waves. One of the pair of transducers is located upstream of the other and each transducer alternately transmits and receives bursts of ultrasonic energy. The difference in the transit times in the upstream vs. the downstream directions ($T_U - T_D$) measured over the same path is used to calculate the flow through the pipe:

$$V = K \cdot D / \sin 2\theta \cdot 1/(T_0 - \tau)^2 \, \Delta T$$

where:

V=mean velocity of flowing fluid
K=constant
D=i.d. of the pipe
Θ=incident angle of ultrasonic burst waves
$T_0$=zero flow transit time $$\Delta T = T_2 - T_1$$

$T_1$=transit time of burst waves from upstream transmitter to downstream receiver
$T_2$=transit time of burst waves from downstream transmitter to upstream receiver
τ=transit time of burst waves through pipewall or lining This equation shows that the flow velocity is directly proportional to the measured difference between upstream and downstream transit times. Because the cross sectional area of the pipe is known, the product of that area and the flow velocity will provide a measure of volumetric flow. Such calculations are typically performed by microprocessor-based converters associated with the flowmeter apparatus of such devices.

Flowmeters are classified into two distinct measurement types based upon the positioning of the ultrasonic transducers. In the oblique measurement type, the propagation course of the applied ultrasonic waves is tilted typically at 45° from a flow direction of the measured fluid. In the parallel measurement type, the propagation course of the ultrasonic waves is substantially parallel to the flow direction of the fluid.

The oblique measurement type finds advantage in that it can be used on a straight length of measuring pipe and, therefore is substantially free from potential pressure losses and relatively simple in its construction. However, when the measuring pipe is small in diameter, the propagation course of the ultrasonic wave within the fluid is also shortened in length, which reduces the measuring accuracy of the ultrasound propagation time and, therefore, the accuracy of the fluid flow measurement. Consequently, the oblique measurement type of flowmeter construction is not suitable in measuring flow rate in pipes having a small bore diameter and/or a low flow velocity.

Typically, parallel measurement type flowmeters require that the transducers be smaller than the inside diameter of the pipe in order to efficiently couple the acoustic energy into the medium being measured and not into the pipe wall. Pipes having a small cross-section diameter (here defined as those having a cross-section diameter roughly equal to the transducer diameter) have a portion of the acoustic energy coupled directly into the pipe wall. The burst signal then arrives at the receiving transducer having followed two separate paths: one through the medium being measured and the other through the pipe wall. The two arrival times may be similar for applications that measure liquids since velocity in the liquid is similar to velocity in the solid pipe wall; however, they may be very different when the medium being measured is a gas. Therefore, the cross section size of the ultrasonic transducer becomes a limiting factor in the parallel measurement type of flowmeter design.

BRIEF SUMMARY OF THE INVENTION

In accordance with the present invention, there is provided a flowmeter detector for measuring the flow volume of a fluid medium. The flowmeter detector includes a measuring line having an interior bore extending from a first closed end to a second closed end. A fluid medium entry port is located adjacent the first closed end extending from the exterior of the measuring line into the interior bore. The fluid medium entry port conveys fluid medium from a source into the measuring line. The flowmeter detector further includes a fluid medium exit port located adjacent the second closed end, extending from the interior bore to the exterior of the measuring line. The exit port conveys the fluid medium from the measuring line back to the source. The entry and exit ports can be oriented either perpendicularly or obliquely to the longitudinal axis of the interior bore.

A first acoustic energy transducer is attached to the first closed end. The first transducer is arranged to alternatively transmit and receive pulsed acoustic energy. Similarly, a second acoustic energy transducer is attached to the second closed end. The second transducer is similarly arranged to alternatively transmit and receive pulsed acoustic energy. The first and second acoustic transducers have an overall dimension that is less then the cross-section diameter of the interior bore of the measuring line, thereby coupling all of transducer acoustic energy into the interior bore.

Each transducer can be mounted directly to the measuring line end wall or through an acoustic coupler. The acoustic coupler is arranged to focus the acoustic energy into a measuring line interior bore that has a cross-section diameter less than the overall dimension of an attached transducer.

A control circuit is connected to the first and second acoustic transducers. The control circuit is operated into a first mode placing the first and second transducers into a sender mode which simultaneously, from opposite ends of the measuring line, transmits pulsed acoustic energy into the interior bore and the fluid medium flowing between the entry and exit ports. Subsequently, the control circuit is operated into a second mode which places the first and second transducers into a receiver mode each receiving the others' acoustic energy propagated through the interior bore and the fluid medium.

The acoustic energy received by the first and second transducers is passed to an evaluation circuit. The evaluation circuit calculates the flow volume of the fluid medium flowing in the measuring line by determining the difference in the travel times of the pulsed acoustic energy transmitted by the first and second acoustic transducers.

It is, therefore, an object of the present invention to provide a flowmeter detector for use with pipes having small bore diameters an/or low flow rates.

It is also an object of the present invention to provide a flowmeter detector that efficiently couples all of the acoustic energy from a transducer into the interior bore of a measuring line having a small bore diameter.

BRIEF DESCRIPTION OF THE SEVERAL VIEWS OF THE DRAWINGS

Other objects, features, and advantages of the present invention will be apparent from the following description of a preferred embodiment thereof, taken in conjunction with the sheets of drawings, in which.

DETAILED DESCRIPTION OF THE INVENTION

Figure 1:
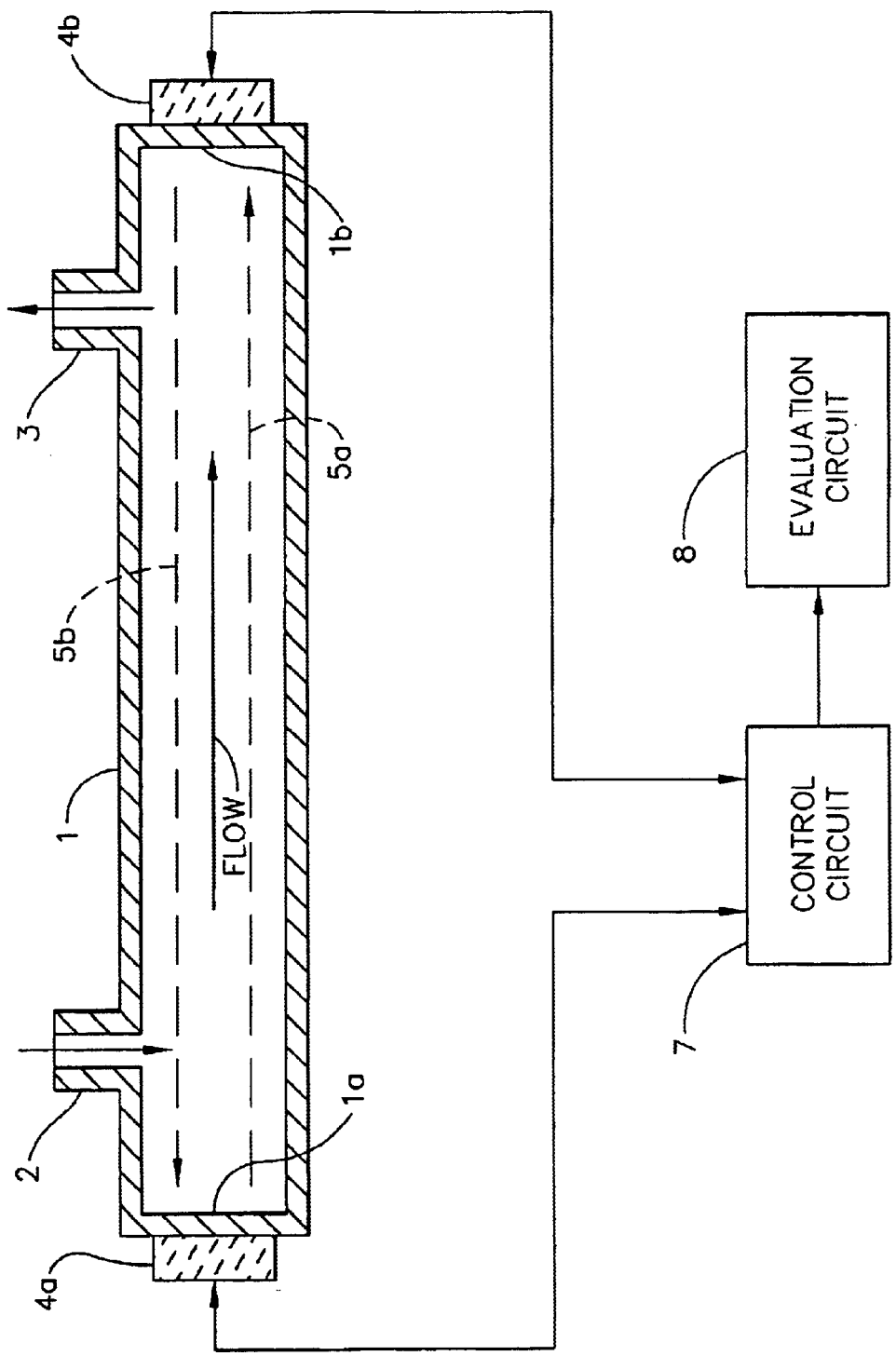
FIG. 1 is an ultrasonic flowmeter detector in accordance to the present invention.

Turning to FIG. 1, the ultrasonic detector for a flowmeter detector in accordance to the present invention is shown. The detector includes a measuring pipe 1, an inlet port 2 placed on a first end, or upstream side, of the measuring pipe 1 and an outlet pipe 3 placed on a second end, or downstream side, of measuring pipe 1. The measuring pipe 1 is constructed of a substantially straight conduit with opposite upstream and downstream closed end portions 1a, 1b. FIG. 1 shows the inlet port 2 and outlet port 3 oriented at 90° to the flow of the medium within pipe 1. It will be appreciated by those skilled in the art that ports 2 and 3 can be oriented so as to form a less than 90° entry into pipe 1. For example, a 45° entry orientation (not shown) of inlet port 2 and outlet port 3 would reduce the pressure drop of the fluid medium through the pipe 1.

As shown in FIG. 1, the closed end portions 1a, 1b are flat plates and are perpendicular to the direction of flow of the fluid medium flowing in measuring pipe 1. Mounted at each of the closed end portion 1a, 1b is a conventional piezoelectric transducer 4a, 4b, each transducer functioning both as an acoustic sender and receiver. Transducers 4a, 4b are typically constructed from a piezoelectric ceramic and constructed to convert electrical energy to acoustic energy when in the sender mode and to convert acoustic energy into electrical energy when in the receiver mode. The input and output signals necessary to operate transducers 4a and 4b are fed in from a control circuit 7 typically a part of the flowmeter apparatus.

The control circuit provides an input signal to transducers 4a and 4b that place the transducers in the sender mode to operate and generate a pulsed acoustic signal. The acoustic signal from transducer 4a is coupled into measuring pipe 1 via end wall 1a. The acoustic signal produced by transducer 4a propagates through the fluid medium in measuring pipe 1 toward transducer 4b in the direction shown by line 5a. Similarly and simultaneously, an acoustic signal from transducer 4b is propagated through the fluid in measuring pipe 1 toward transducer 4a, as shown by line 5b. The control circuit then operates to place both transducers 4a and 4b in the receiving mode of operation so that they can receive the acoustic signal traveling within measuring pipe 1. The signals received by transducers 4a and 4b are sent to an evaluation circuit 8 that calculates the flow rate of the fluid in measuring pipe 1 based on a propagation time difference between the travel of acoustic waves 5a and 5b through the fluid medium flowing in measuring pipe 1.

The distance between closed end portions 1a and 1b can be spaced at a greater or lesser distance in order to accomplish a more exact flow reading. For example, in low-flow situations the distance between end portions 1a and 1b can be made greater than the distance typically used for a high-flow rate. The increased distance increases the time that the acoustic signals 5a and 5b traverse the fluid medium and, therefore, increase the accuracy of the measurement.

To effectively couple all the acoustic energy produced by the ultrasonic transducers into measuring pipe 1 the transducers are required to be smaller than the bore diameter of the measuring pipe. The smallest practical ceramic transducers 4a and 4b currently manufactured are approximately 1 centimeter in diameter. Therefore, pipe 1 cannot be made smaller than 1 centimeter or a majority of the acoustic energy will be coupled into the pipe wall, thereby, reducing the signal level and accuracy of the detector.

Figure 2:
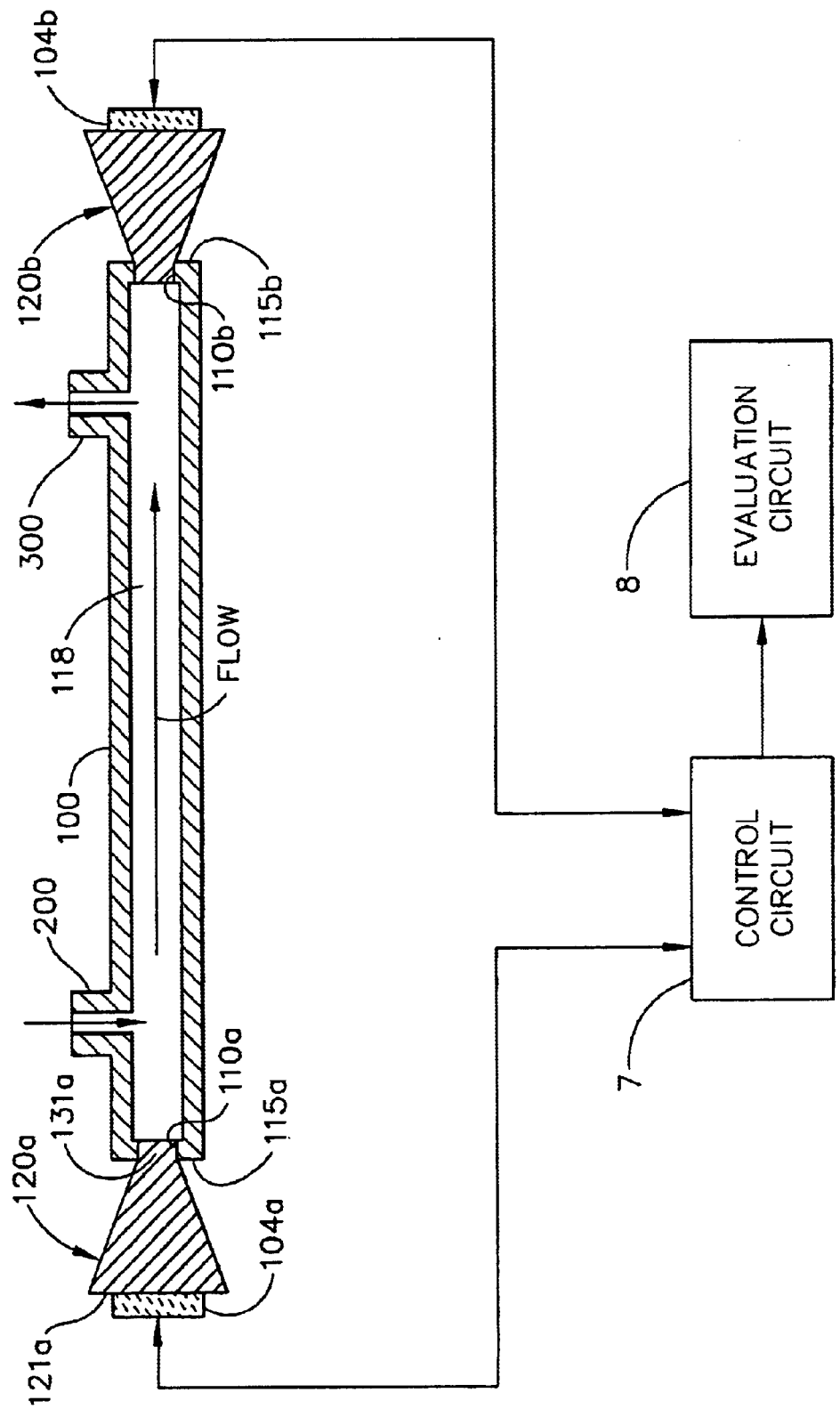
FIG. 2 is an ultrasonic flowmeter detector including acoustic couplers in accordance to the present invention.

In certain applications it is desirable to measure flow rate in pipes or conduits that are less than 1 centimeter in diameter. Turning now to FIG. 2 of the included drawings, the ultrasonic detector of the present invention is shown configured to be used in extremely small-bore diameter pipes of approximately 1 centimeter or less.

The detector of FIG. 2 includes a measuring pipe 100, an inlet port 200 placed on a first end, or upstream side, of the measuring pipe 200 and an outlet pipe 300 placed on a second end, or downstream, side of measuring pipe 100. The measuring pipe 100 is constructed of a substantially straight conduit with opposite upstream and downstream openings 110a, 110b. As shown in FIG. 2, openings 110a and 110b extend through end wall 115a and 115b respectively from the exterior of pipe 100 into an interior bore 118. Mounted to each opening 110a and 110b is a generally conically shaped acoustic coupler 120a and 120b, respectively. Acoustic coupler 120a, is arranged as a monolithic structure, composed of good sound conducting material. An end surface 121a is adapted to receive, and have mechanically mounted thereon, a piezoelectric transducer 104a. The end opposite surface 121a is arranged into a solid generally cylindrical member 131a, having an outside diameter sized to be accepted within opening 110a. Acoustic coupler 120a tapers uniformly or exponentially from the larger diameter of mounting surface 121a to the smaller outside diameter of cylindrical member 131a.

FIG. 2 shows acoustic couplers 120a and 120b mounted to pipe 100 via openings 110a and 110b respectively. It will be appreciated by those skilled in the art that couplers 120a and 120b can also be mounted to pipe 100 having solid end walls.

Figure 3:
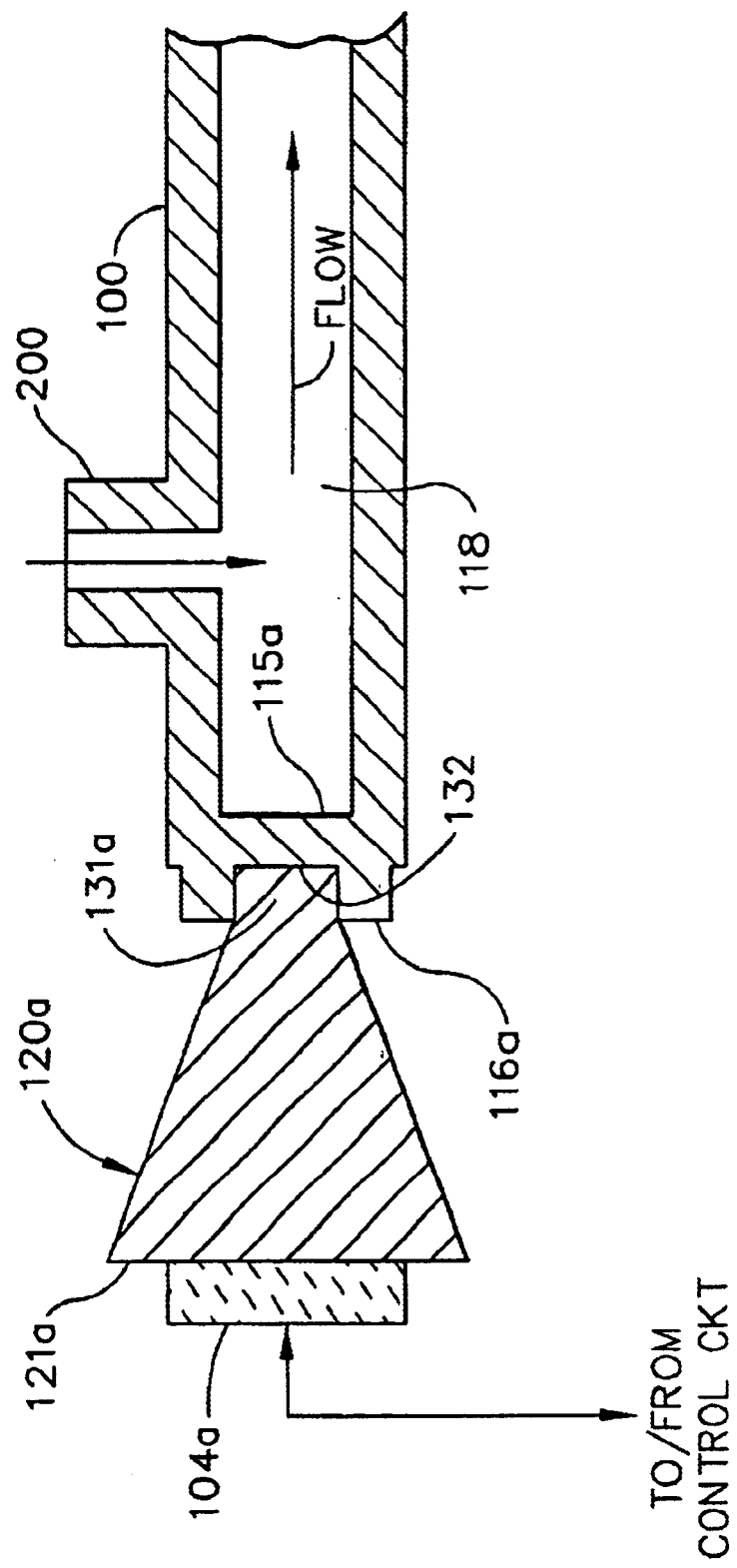
FIG. 3 is an ultrasonic flowmeter detector including acoustic couplers showing an alternative arrangement for mounting the coupler to the measuring line in accordance to the present invention.

FIG. 3, shows pipe 100 having a solid end 115a oriented perpendicular to the flow of the medium flowing in the interior bore 118 of pipe 100. A surface 132 of cylindrical member 131a is mounted directly on end wall 115a using any convenient means. FIG. 3 shows cylindrical member 131a captured within perimeter wall 116a extending outward from end 115a; however, it will be appreciated by those skilled in the art that other methods for fixing permanently or temporarily acoustic coupler 120a to end 115a can be employed.

Acoustic coupler 120b (not shown) is constructed in the same manner as acoustic coupler 120a and functions substantially in the same manner as explained earlier for acoustic coupler 120a. Acoustic couplers 120a and 120b effectively couple the acoustic energy produced by the larger diameter ultrasonic transducer into the smaller interior bore diameter 118 of pipe 100. Additionally, the acoustic couplers of the present invention allow for the straightforward matching of the impedance of the transducer 104a, 104b to the density of the fluid flowing in pipe 100.

The acoustic impedance of an ultrasonic transducer is defined as:

$$Z = \rho V$$

where:
$\rho$ = the density of the material
$V$ = acoustic velocity in the material The impedance of the transducer must be matched to the fluid medium being measured in order to efficiently couple the acoustic energy into the medium. The resonant acoustic frequency used for measuring gases is typically 25 kHz, while the resonant frequency used for liquids is 1 Mhz. A properly designed acoustic coupler 120a, 120b can be used to effectively couple the ultrasonic transducers to a measuring pipe 100 with minimal coupling loss due to transducer acoustic impedance mismatch.

The present invention has been described with particular reference to the preferred embodiments thereof. It will be obvious that various changes and modifications can be made therein without departing from the spirit and scope of the invention as defined in the appended claims.

What is claimed is:

1. A flowmeter detector for determining the flow volume of a fluid medium, said flowmeter detector comprising:
   a measuring line having first and second ends and fluid medium entry and exit ports adjacent said first and second ends, respectively, said fluid medium flowing within said measuring line between said entry and exit ports;
   first and second acoustic couplers for introducing acoustic energy into said measuring line located at said first and second ends, respectively; each of said acoustic couplers including;
   a cylindrical portion having a planar end wall on one end attached to a respective and associated first and second end, said cylindrical portion having a cross-section diameter less than the cross-section diameter of said interior bore; and
   a conical portion including a frustum extending from a second end of said cylindrical member, to a base surface having a diameter greater than the cross-section diameter of said interior bore, said conical member base surface having an acoustic transducer attached thereon;
   each of said transducers first operated to simultaneously transmit pulsed acoustic energy into said measuring line, and subsequently operated to receive the acoustic energy propagated through said measuring line; and
   means for receiving the acoustic energy propagated through said measuring line to determine said flow volume by evaluating the difference in the travel times of the pulsed acoustic energy propagated through said measuring line.

2. The flowmeter detector as claimed in claim 1 wherein, said first and said second ends are located at opposite ends of said measuring line.

3. The flowmeter detector as claimed in claim 2 wherein, said measuring line including an interior bore extending between said first and second ends and said fluid entry port being located adjacent said first end extending from the exterior of said measuring line into said interior bore, said fluid entry port conveying said fluid medium from a source into said interior bore, and said fluid exit port located adjacent said second end extending from the exterior of said measuring line into said interior bore, said fluid exit port conveying said fluid medium from said interior bore back to source.

4. The flowmeter detector as claimed in claim 3 wherein each of said fluid entry and exit ports extends into said measuring line perpendicularly to said interior bore.

5. The flowmeter detector as claimed in claim 3 wherein each of said fluid entry and exit ports extends into said measuring line obliquely to said interior bore.

6. The flowmeter detector as claimed in claim 3 wherein, said first and second ends being closed ends and each first and second closed ends is comprised of first and second walls oriented perpendicular to the interior bore.

7. The flowmeter detector as claimed in claim 6 wherein each of said first and second walls includes an opening having a cross-section diameter less than the cross-section diameter of said interior bore and said opening extending through its respective wall into said interior bore and each said first and second acoustic couplers including:
   a cylindrical portion arranged to be accepted into an end wall opening with a first planar end wall extending into said interior bore; and
   a conical portion including a frustum extending from a second end of said cylindrical member to a base surface having a diameter greater than the cross-section diameter of said interior bore, said conical portion base surface having an acoustic transducer attached thereon;
   thereby locating first and second acoustic transducers on opposite ends of said measuring line;
   whereby said first and said second acoustic transducers are operated to introduce and subsequently receive said pulsed acoustic energy through first and second couplers from said measuring line interior bore.

8. The flowmeter detector as claimed in claim 7 wherein said means for receiving includes:
   a control circuit operatively connected to said first and second transducers for operating said first and second transducers to simultaneously transmit pulsed acoustic energy into said interior bore and said fluid medium flowing between said entry and exit ports, and
   said control circuit means alternatively operating said first and second transducers to each receive the acoustic energy propagated through said fluid medium and said interior bore; and
   evaluation circuit means for receiving said acoustic energy propagated through said interior bore, said evaluation means determining the flow volume of the fluid medium flowing in the measuring line by evaluating the difference in the travel times of the pulsed acoustic energy propagated through said measuring line.

* * * * *